United States Patent
Lumbatis

(10) Patent No.: US 11,388,577 B2
(45) Date of Patent: Jul. 12, 2022

(54) STATION STEERING PROFILES IN A WIRELESS NETWORK CONTROL SYSTEM

(71) Applicant: ARRIS Enterprises LLC, Suwanee, GA (US)

(72) Inventor: Kurt Alan Lumbatis, Dacula, GA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 16/548,080

(22) Filed: Aug. 22, 2019

(65) Prior Publication Data

US 2020/0077251 A1    Mar. 5, 2020

Related U.S. Application Data

(60) Provisional application No. 62/723,729, filed on Aug. 28, 2018.

(51) Int. Cl.
*H04W 8/00* (2009.01)
*H04W 76/20* (2018.01)
(Continued)

(52) U.S. Cl.
CPC .......... *H04W 8/005* (2013.01); *H04W 36/14* (2013.01); *H04W 76/10* (2018.02); *H04W 76/20* (2018.02); *H04W 84/12* (2013.01)

(58) Field of Classification Search
CPC ..... H04W 8/005; H04W 48/20; H04W 24/02; H04W 36/14; H04W 76/10; H04W 76/20; H04W 36/22; H04W 84/12; H04W 80/10; H04W 16/04; H04W 28/02; H04W 4/50; H04W 4/60; H04W 60/04; H04W 72/0493; H04W 72/1257; H04W 8/065; H04W 12/06; H04W 36/12; H04W 4/14; H04W 76/12; H04W 8/14; H04W 36/08;
(Continued)

(56) References Cited

U.S. PATENT DOCUMENTS 9,936,028 B2 *   4/2018   Ganu .............. H04W 36/00837
2014/0204802 A1 *  7/2014   Han .................... H04W 72/085
                                                 370/255
(Continued)

OTHER PUBLICATIONS

PCT International Search Report & Written Opinion, RE: Application No. PCT/US2019/047672, dated Nov. 8, 2019.
(Continued)

*Primary Examiner* — Wutchung Chu
(74) *Attorney, Agent, or Firm* — Wenderoth, Lind & Ponack, L.L.P.

(57) ABSTRACT

In a managed wireless environment where a controller is gathering data in order to optimize the wireless network, certain data parameters are gathered in order to optimize the network. The gathered parameters are then utilized to determine best case links for various attached wireless station devices in order to: 1) optimize the network and 2) optimize the per station (STA) links. The control points utilized to determine the network optimization will vary based on the desired outcomes for the system. As such, configurable 'profiles' will be utilized in order to prioritize outcomes for the system. These profiles may be utilized by the network steering controller in order to steer wireless station devices to optimize the network in the desired fashion.

17 Claims, 5 Drawing Sheets

(51) Int. Cl.
*H04W 84/12* (2009.01)
*H04W 76/10* (2018.01)
*H04W 36/14* (2009.01)

(58) Field of Classification Search
CPC ....... H04W 36/0044; H04W 36/00835; H04W 36/0088; H04W 36/26; H04W 36/30; H04W 40/12; H04W 40/22; H04W 40/24; H04W 24/10; H04W 36/02; H04L 45/121; H04L 45/122; H04L 45/124; H04L 45/125; H04L 45/22; H04L 45/302
See application file for complete search history.

(56) References Cited

U.S. PATENT DOCUMENTS

| | | | | |
|---|---|---|---|---|
| 2015/0120930 A1* | 4/2015 | Kamthe | ................ | H04W 48/20 709/226 |
| 2015/0181405 A1* | 6/2015 | Dua | ...................... | H04W 4/021 455/456.3 |
| 2015/0223168 A1* | 8/2015 | Bhanage | ........... | H04W 52/0229 370/311 |
| 2015/0373636 A1 | 12/2015 | Karaca et al. | | |
| 2016/0088521 A1* | 3/2016 | Ho | ...................... | H04W 28/085 455/453 |
| 2016/0249267 A1* | 8/2016 | Ho | ........................ | H04W 36/30 |
| 2016/0323780 A1* | 11/2016 | Bhanage | ............... | H04W 28/08 |
| 2017/0374602 A1* | 12/2017 | Gokturk | ................ | H04W 40/12 |
| 2018/0152861 A1* | 5/2018 | Giraldo Rodriguez | ...................... | H04W 28/08 |
| 2018/0160311 A1* | 6/2018 | Shaw | .................... | H04W 8/082 |
| 2018/0176284 A1 | 6/2018 | Strater et al. | | |
| 2018/0192471 A1* | 7/2018 | Li | ........................ | H04W 8/065 |
| 2018/0302832 A1* | 10/2018 | Huang | ............ | H04W 36/00835 |
| 2018/0310240 A1* | 10/2018 | Kannan | .................. | H04W 48/14 |
| 2019/0182680 A1* | 6/2019 | Vannucci | ................. | H01Q 3/40 |
| 2019/0253893 A1* | 8/2019 | Hodroj | .................. | H04W 12/06 |
| 2019/0253960 A1* | 8/2019 | Hodroj | .................. | H04W 36/14 |
| 2019/0268823 A1* | 8/2019 | Gokturk | ................. | H04L 43/12 |
| 2019/0281608 A1* | 9/2019 | Huang | .................. | H04W 16/00 |
| 2019/0312924 A1* | 10/2019 | Bhagavatula | ......... | H04W 88/10 |
| 2020/0068440 A1* | 2/2020 | Talbert | .................. | H04W 72/10 |
| 2020/0068483 A1* | 2/2020 | Likar | .................... | H04W 76/11 |
| 2020/0162986 A1* | 5/2020 | Pati | ........................ | H04W 36/08 |
| 2020/0322216 A1* | 10/2020 | Singla | ................. | H04L 41/0806 |

OTHER PUBLICATIONS

International Preliminary Report on Patentability and Written Opinion dated Mar. 2, 2021 in International (PCT) Application No. PCT/US2019/047672.

\* cited by examiner

STATION STEERING PROFILES IN A WIRELESS NETWORK CONTROL SYSTEM

CROSS REFERENCE TO RELATED APPLICATION

This application is a non-provisional application claiming the benefit of U.S. Provisional Application Ser. No. 62/723,729, entitled "Application of WLAN Station Steering Profiles in a Wireless Network Control System," which was filed on Aug. 28, 2018, and is incorporated herein by reference in its entirety.

TECHNICAL FIELD

This disclosure relates to station steering based upon steering profiles.

BACKGROUND

Typically, an access point such as a gateway device may provide a plurality of services to a customer premise, and the plurality of services may be provided through a wired interface and/or wireless communications passed between the access point and one or more client devices or stations. One or more network extenders (e.g., extenders, repeaters, etc.) may be installed within a customer premise to expand the range of a wireless network that is provided by an access point.

A WLAN (wireless local area network) deployment may include multiple link points (e.g., access points, network extenders, repeaters, etc.). The WLAN may comprise an extended service set (ESS), wherein repeaters and/or network extenders are present either via a WLAN or LAN (local area network) link. It is desirable to provide methods and systems for facilitating station steering based upon various user/operator requirements.

BRIEF DESCRIPTION OF THE DRAWINGS

Like reference numbers and designations in the various drawings indicate like elements.

DETAILED DESCRIPTION

In a managed wireless environment where a controller is gathering data in order to optimize the wireless network, certain data parameters are gathered in order to optimize the network. The gathered parameters are then utilized to determine best case links for various attached wireless station devices in order to: 1) optimize the network and 2) optimize the per station (STA) links. The control points utilized to determine the network optimization will vary based on the desired outcomes for the system. As such, configurable 'profiles' will be utilized in order to prioritize outcomes for the system. These profiles may be utilized by the network steering controller in order to steer wireless station devices to optimize the network in the desired fashion. The solution described herein defines a set of profiles to be applied or configured by customers or ISOs via the methods described below.

In a wireless network node where an implementation of STA steering between network nodes is implemented, differing steering profiles may be utilized to control the steering algorithms based on the desired outcome in the steering of STAs between the network nodes. Control mechanisms and configuration parameters in the implementation of such a system are described herein. The profiles may be utilized by the user or an ISP to configure the home network controller in the implementation of these station steering profiles. In embodiments, a set of profiles and differing algorithms may be defined in order to effect the desired outcomes. One example may be a profile which may optimize video delivery across the home network in the case of a primary use case of delivering video services across the network. Another example may be to load balance the network such that over-the-top video may be received by generic devices and avoid channel over-load. Example profiles and algorithm usage are described herein.

Figure 1:
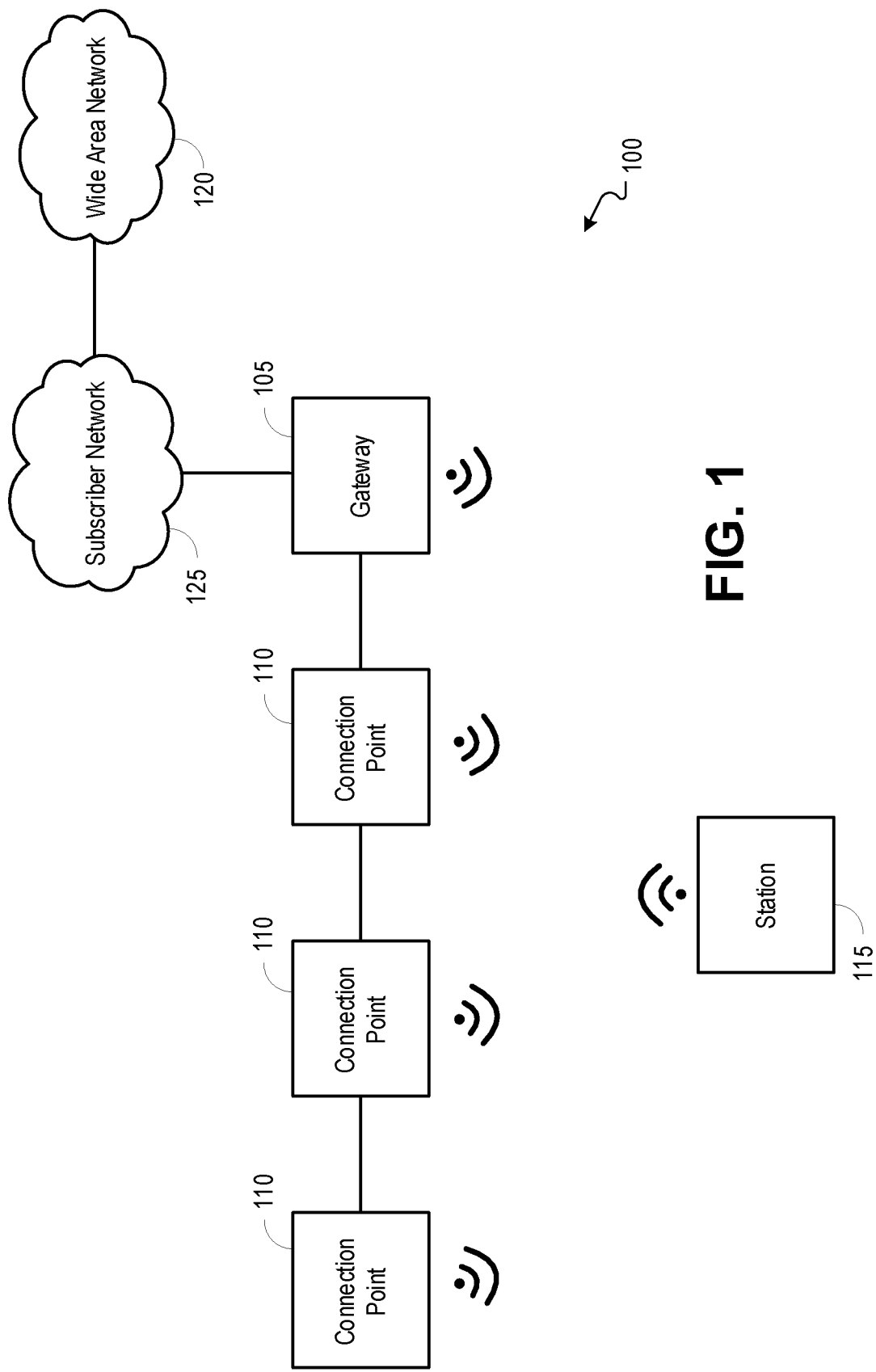
FIG. 1 is a block diagram illustrating an example network environment operable to facilitate station steering based upon one or more steering profiles.

FIG. 1 is a block diagram illustrating an example network environment 100 operable to facilitate station steering based upon one or more steering profiles. In embodiments, a local network (e.g., a WLAN) may include one or more link points. The local network may include a deployment of link points comprising an extended service set (ESS), and the link points may be interconnected via a WLAN and/or LAN link. The link points may include one or more gateways 105 and one or more connection points 110. It should be understood that the connection points 110 may include extender devices and/or repeater devices. In embodiments, a gateway 105 may route communications to and from the one or more connection points 110 and/or one or more stations 115. For example, the one or more connection points 110 and/or one or more stations 115 may be provisioned to receive video service(s), data service(s), and/or voice services through the gateway 105. In embodiments, a gateway 105 may include a multimedia gateway, a cable modem, a wireless router including an embedded cable modem, a mobile hot-spot router, a multimedia over coaxial alliance (MoCA) node, and any other device that is operable to route communications to and from a connection point 110 and/or station (STA) 115.

In embodiments, stations 115 may include a wide variety of devices such as televisions, mobile devices, tablets, set-top boxes, computers, and any other device that is capable of utilizing a video, data, or telephony service. In embodiments, a gateway 105 may provide one or more service sets, and the service sets may be identified using unique service set identifiers (SSID). Service sets may be used for delivering traffic between the gateway 105 and the connection points 110 and/or station 115, and each service set may be designated for a particular service (e.g., video, data, security, hotspot, etc.). In embodiments, a station 115 may identify a service set and may connect to a service set provided by the gateway 105.

In embodiments, a connection point 110 may be associated with a gateway 105, and the connection point 110 may facilitate the delivery of multiple services to one or more stations 115. The one or more connection points 110 may be configured with network parameters of the associated gateway 105, thereby extending the range of a wireless network provided by the gateway 105. For example, a connection point 110 may be configured with SSID(s), passwords/passphrases, and various other wireless parameter information associated with the gateway 105. It will be appreciated by those skilled in the relevant art that a channel of communication may be established between the gateway 105 and a connection point 110 using any of a variety of communication technologies (e.g., MoCA, 802.11, G.hn, HomePlug AV (HPAV), HPAV2, Bluetooth, Zigbee, Zwave, etc.).

Once connected to a service set provided by the gateway 105 or connection point 110, a station 115 may receive content and/or services from upstream networks or servers (e.g., wide area network (WAN) 120), and may communicate with other stations 115 connected to the same service set. For example, communications between stations 115 and a gateway 105 or connection point 110 may include wireless communications (e.g., 802.11 packet exchanges).

In embodiments, a gateway 105 may route communications between one or more stations 115 and a wide area network (WAN) 120 via a subscriber network 125. The subscriber network 125 may include various networks such as coaxial cable, optical fiber, twisted pair network, wireless networks including 4G and LTE, and others.

In embodiments, one or more connection points 110 may be connected to a gateway 105 via a multimedia over coax alliance (MoCA) connection or any other physical medium used for communication (e.g., MoCA, 802.11, G.hn, HomePlug AV (HPAV), HPAV2, Bluetooth, Zigbee, Zwave, etc.). The gateway 105 may create one or more virtual local area networks (VLAN) over a MoCA interface to correspond with service set identifiers (SSID) (e.g., private SSID, Ethernet, etc.) at the one or more connection points 110. The gateway 105 may maintain a record identifying device(s) associated with each of the one or more connection points 110.

In a wireless network in which a gateway 105 has been configured with a controller implemented to control the steering of stations 115 between different connection points 110 of the network, differing configuration parameters may be utilized to manipulate the steering mechanism. It should be understood that the controller may be implemented at the gateway 105, at one or more of the connection points 110, and/or as a standalone device that is located within a customer premise serviced by the gateway 105 or upstream from the gateway 105. The parameters utilized may be, but are not limited to: STA capabilities; signal quality metrics associated with communications between a station and a connection point (e.g., Signal strength received by the current connection point from the STA; Signal strength received at the STA from the current connection point; Signal strength received by the proposed connection point from the STA; Signal strength received by the STA from the proposed connection point, etc.); Current connection point capabilities; Proposed connection point capabilities; Channel utilization of the current channel for the current connection point; Channel Utilization of the proposed channel connection point; Current or average Modulation Coding Scheme (MCS) to the STA from the gateway at the current connection point; Current or average Modulation Coding Scheme (MCS) from the STA to the gateway at the current connection point; Current or average downlink data throughput rate to the STA at the current connection point; Current or average downlink data throughput rate to the STA at the new connection point; Channel utilization of the STA at the current connection point and data rate; Estimated signal strength at the STA from the gateway on the proposed connection point channel; Estimated signal strength at the gateway from the STA on the proposed connection point channel; Frequency of the Current connection point; Frequency of the proposed connection point; Transmit Power of the radio on the current connection point; Transmit power of the radio on the proposed connection point; Count of associated STAs on the current connection point; Count of associated STAS on the proposed connection point; Loading of the connection point(s) to the root device of the network; STA services currently in use; Required STA throughput; Network Events to trigger steering.

These parameters may be utilized by steering logic to determine at what point in time and to which connection point to 'steer' a STA 115 to optimize the WLAN network. Differing threshold, utilization, strength, or other values may be configured for use by the steering control algorithm which determine the 'characteristics' of the steering algorithm. The concept of a set of 'steering profiles' may be incorporated and may allow the ISP or home customer to tune the characteristics of the steering algorithm for a desired outcome. Described herein are concepts and possible implementations of steering profiles that may be utilized by STA steering control logic implementations. As an example, various default parameters may be utilized to prioritize video delivery on one radio of a dual band concurrent WLAN solution. As another example, load balancing and moving STA 115 devices to a higher capacity band or radio (e.g., 5 GHz radio) in a deployment may be prioritized, and in response to this prioritization, WLAN STA 115 devices may be moved much more quickly from one band or radio (e.g., the 2.4 GHz radio) to another band or radio (e.g., the 5 GHz radio).

In embodiments, a connection point 110 to which a STA 115 is connected may not be the 'optimal' connection point for the STA. Steering logic at the gateway 105 may determine: 1) if this is the optimal connection point for a given STA, and 2) if this is the optimal connection point for a given STA in the overall network (e.g., the LAN provided by the gateway 105). The decision may be determined via the utilization of a currently active 'Steering Profile' which dictates the desired steering metric values, thresholds, events and decision points.

In embodiments, a determination may be made as to a channel impact from moving a station 115 to one or more of the gateway 105 or connection point 110. Utilizing the total impact of a station 115 as the station 115 is moved across the various link points (e.g., gateway 105, connection points 110), an optimal connection point 110 may be selected, wherein the optimal connection point 110 is the link point to which the station 115 may be moved according to one or more parameters of an active steering profile.

Figure 2:
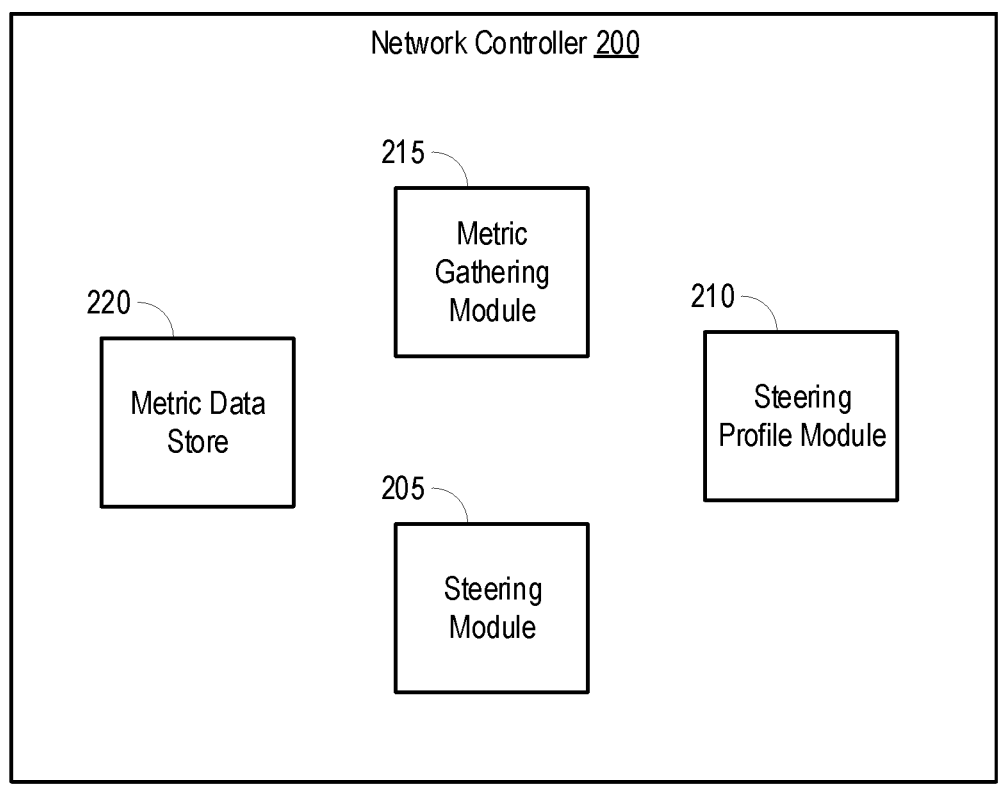
FIG. 2 is a block diagram illustrating an example network controller operable to facilitate station steering based upon one or more steering profiles.

FIG. 2 is a block diagram illustrating an example network controller 200 operable to facilitate station steering based upon one or more steering profiles. The network controller may include a steering module 205, a steering profile module 210, a metric gathering module 215, and a metric data store 220. It should be understood that the network controller 200 may be implemented at a gateway 105 of FIG. 1, at one or more of the connection points 110 of FIG. 1, and/or as a standalone device that is located within a customer premise serviced by the gateway 105 or upstream from the gateway 105.

As part of the steering logic a metric gathering module 215 may gather statistical information and metrics about the network (e.g., network 100 of FIG. 1) and coalesce the statistics and metrics for use by the steering module 205. The statistics and metrics gathered may include (but is not limited to) those listed above. Gathered statistics and metrics may be stored at the metric data store 220.

The steering module 205 may then digest the received statistical and metric data and determine the 'best' use of network resources (as defined by the 'Steering Profile') to assure network and STA performance per the defined and active 'Steering Profile'. The steering logic may be centralized or distributed across devices in the network.

The steering module 205 may periodically or upon reception of specific events from the network or system re-assess the connection points of attached STA devices in the network. Based on this assessment and in conjunction with the 'Steering Profile' which gives the steering module 205 the network optimizations desired, the steering module 205 may then steer STAs (e.g., STAs 115 of FIG. 1) to differing connection points (e.g., connection points 110 of FIG. 1). As an example, the steering profiles may be maintained and configured at the steering profile module 210.

Each 'Steering Profile' provides specific trigger points, thresholds, hysteresis values, channel loading maximums, events to handle, and other values which the steering module 205 utilizes in making steering decisions to meet the requirements imposed by the profile. Some examples of differing steering profiles may include: a profile to optimize the network for drywall construction materials with specific values for material radio energy absorption; a profile to optimize the network for concrete construction materials with differing values for material radio energy absorption; a profile to optimize the network for video delivery utilizing a specific frequency band; a profile to optimize the network for IoT operation utilizing a specific frequency band; a profile to optimize the network for total STA throughput, regardless of airtime usage; a profile to minimize airtime usage of all STAs; a profile to optimize certain QoS services to specific STAs utilizing this QoS profile; and other defined profiles. It should be understood that other profiles may be defined and configured which, when applied to the steering algorithm (e.g., applied by the steering module 205), allows it to make the correct decision points for the network and attached STAs based on the profile in use. The various profiles may be defined by an inclusion and weighting of one or more parameters that are deemed to be relevant to an outcome or priority established by the profile. For example, a steering profile may include an identification of one or more specific bands to be utilized by certain STAs or for delivery of certain types of services, and the steering module 205 may steer STAs to certain connection points or bands based upon these steering profile requirements.

The steering profile module 210 may be configured with one or more pre-defined and/or configured steering profiles which may be utilized in conjunction with the steering module 205 to effect network performance. Through the steering profile module 210, one or more of the steering profiles may be activated, and in response, the steering module 205 may steer STAs according to the one or more requirements of the active steering profile(s). The contents of a steering profile may include, but is not limited to any aspects necessary for the steering module 205 to control: STA connection points to the network; network optimization (e.g., based on aspects of the gathered metrics of the connection point, aspects of the gathered metrics of the attached STA devices, aspects of the deployment scenario, etc.); network events to consider (e.g., radar detect events with associated channel changes; dynamic frequency changes including regulatory domain radio powers for differing channels, STA additions, STA deletions, regulatory domain limitations, etc.); threshold values for various aspects of the steering algorithm's use (e.g., Signal Strength Values, Channel Utilization Values, Effect of STA channel utilization on differing connection points, Hysteresis values to limit multiple near time STA movements, Airtime availability for specific QoS services, etc.); offset values (e.g., Frequency, Connection Point Radio Powers, Connection Point Radio Receive Sensitivity, STA transmit power, STA Radio capabilities, Building Material abortion properties, etc.).

In embodiments, the steering profile may include parameters and steering instructions that are based upon properties associated with one or more building materials (e.g., absorption properties of different building materials). For example, the steering profile may be configured with an identification of certain bands or channels that are to be used by one or more STAs or connection points based upon a building material that is identified with an active steering profile.

Figure 3:
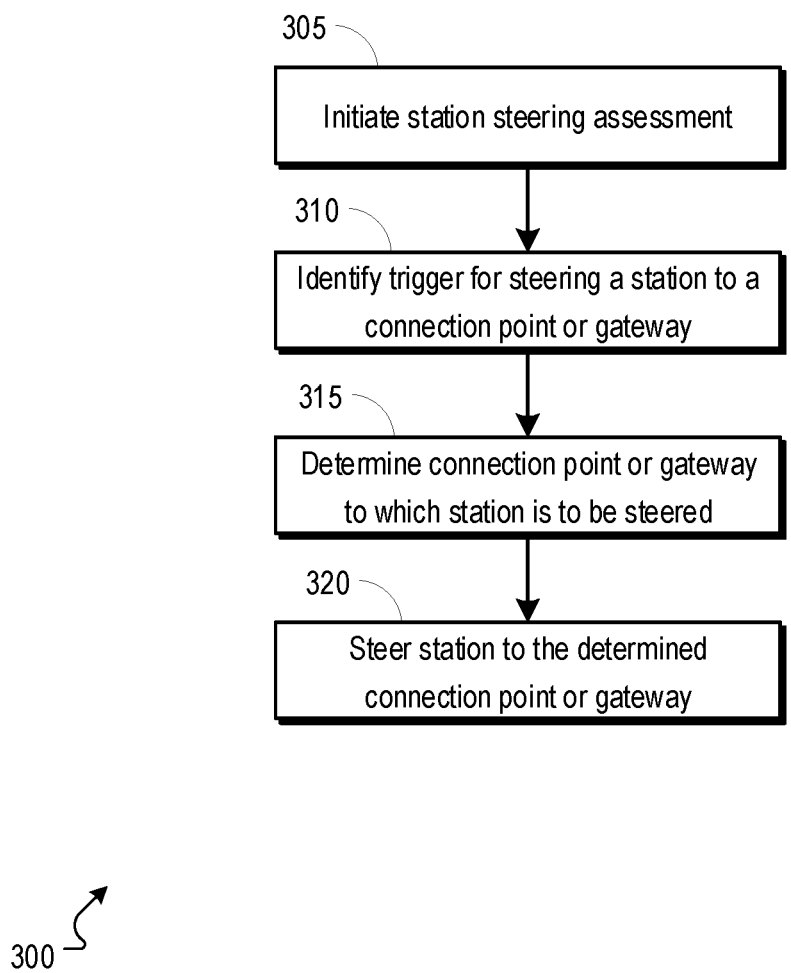
FIG. 3 is a flowchart illustrating an example process operable to facilitate station steering based upon one or more steering profiles.

FIG. 3 is a flowchart illustrating an example process 300 operable to facilitate station steering based upon one or more steering profiles. The process 300 may begin at 305 when a station steering assessment is initiated. For example, a network controller 200 of FIG. 2 may initiate a station steering assessment periodically or upon an identification or detection of specific events. The active steering profile, and one or more parameters of the active steering profile, may be identified by the network controller in response to the initiation of the station steering assessment.

At 310, a trigger for steering a station to a connection point or gateway may be identified. For example, the network controller 200 may gather statistical information and metrics about the network (e.g., local network supported by a gateway 105 of FIG. 1) and coalesce the statistics and metrics for use by a STA steering portion of the network controller 200. In embodiments, the network controller 200 may compare the gathered statistics and metrics to one or more parameters of an active steering profile. The network controller 200 may identify a trigger for steering a station to a connection point or gateway in response to a detection of certain statistics or metrics that are outside of, or within corresponding thresholds or ranges identified from the active steering profile.

At 315, a connection point or gateway to which a station is to be steered may be determined. For example, the network controller 200 may determine one or more stations 115 of FIG. 1 that are to be moved to one or more specific connection points 110 of FIG. 1 in order to meet one or more requirements of the active steering profile (e.g., STA or connection point requirements, service allocation requirements, etc.). In embodiments, the network controller 200 may identify one or more connection points 110 or gateways 105 to which one or more specific stations are to be steered based upon a determination that the steering of the station(s) will meet one or more requirements of the active steering profile.

At 320, one or more stations may be steered to the determined one or more connection points or gateways (e.g., the connection point(s) or gateway(s) determined at 315). For example, the network controller 200 may initiate a steering of the station(s) to the determined connection point(s) or gateway(s).

Figure 4:
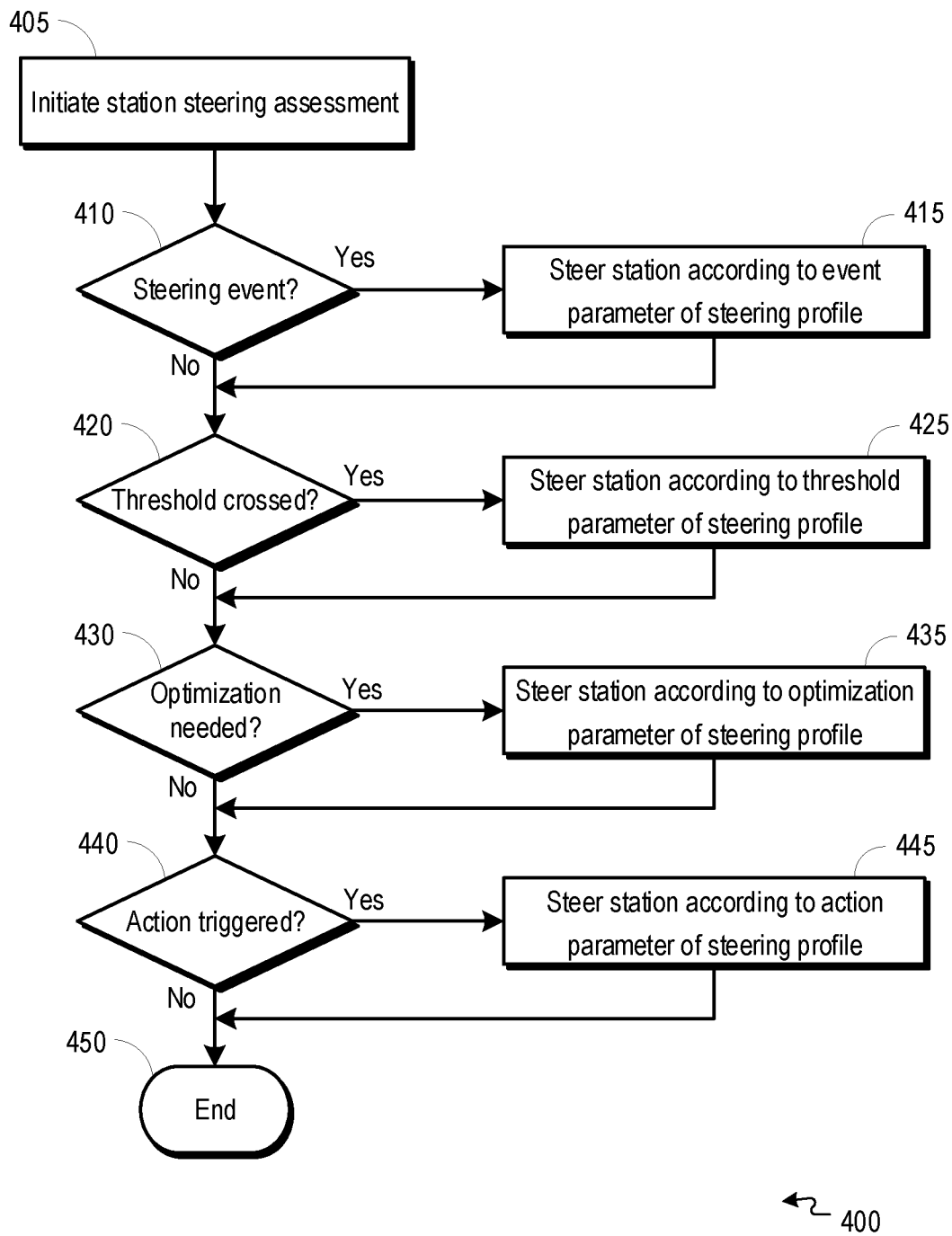
FIG. 4 is a flowchart illustrating an example process operable to facilitate station steering based upon one or more trigger points and one or more corresponding steering profile parameters.

FIG. 4 is a flowchart illustrating an example process 400 operable to facilitate station steering based upon one or more trigger points and one or more corresponding steering profile parameters. The process 400 may begin at 405 when a station steering assessment is initiated. For example, a network controller 200 of FIG. 2 may initiate a station steering assessment periodically or upon an identification or detection of specific events.

At 410, a determination may be made whether a steering event has occurred. For example, the network controller 200 may determine whether a steering event identified within an active steering profile has occurred. If a steering event has occurred, the network controller 200 may initiate a steering of one or more stations according to an event parameter of the active steering profile at 415.

If, at 410, the determination is made that a steering event has not occurred, the process 400 may proceed to 420. At 420, a determination may be made whether a threshold has been crossed. For example, the network controller 200 may determine whether a threshold identified within an active steering profile has been crossed. If a threshold has been crossed, the network controller 200 may initiate a steering of one or more stations according to a threshold parameter of the active steering profile at 425.

If, at 420, the determination is made that a threshold has not been crossed, the process 400 may proceed to 430. At 430, a determination may be made whether an optimization is needed. For example, the network controller 200 may determine whether an optimization identified within an active steering profile is needed. If an optimization is needed, the network controller 200 may initiate a steering of one or more stations according to an optimization parameter of the active steering profile at 435.

If, at 430, the determination is made that an optimization is not needed, the process 400 may proceed to 440. At 440, a determination may be made whether an action has been triggered. For example, the network controller 200 may determine whether an action identified within an active steering profile has been triggered. If an action has been triggered, the network controller 200 may initiate a steering of one or more stations according to an action parameter of the active steering profile at 445.

If, at 440, the determination is made that an action has not been triggered, the process 400 may end at 450.

Figure 5:
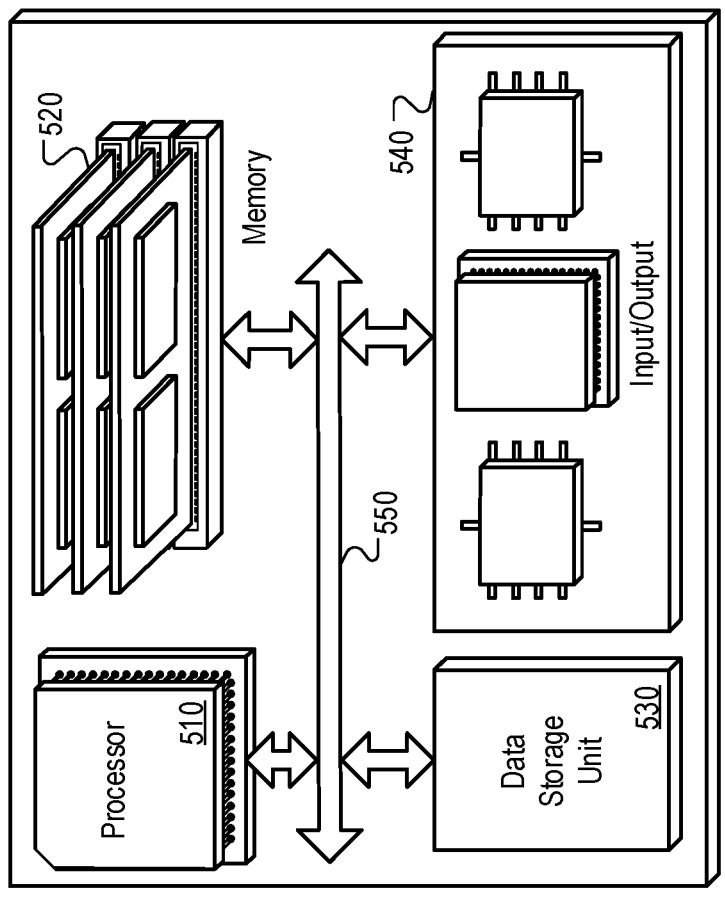
FIG. 5 is a block diagram of a hardware configuration operable to facilitate station steering based upon one or more steering profiles.

FIG. 5 is a block diagram of a hardware configuration 500 operable to facilitate station steering based upon one or more steering profiles. It should be understood that the hardware configuration 500 can exist in various types of devices. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 500. In embodiments, the input/output device 540 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In embodiments, the input/output device can include driver devices configured to send communications to, and receive communications from one or more devices within a subscriber premise (e.g., access point 105 of FIG. 1, station 115 of FIG. 1, network extender 110 of FIG. 1, etc.) and/or one or more networks (e.g., subscriber network 125 of FIG. 1, WAN 120 of FIG. 1, local network, etc.).

Those skilled in the art will appreciate that the invention improves upon methods and apparatuses for steering a station between one or more link points. In a managed wireless environment where a controller is gathering data in order to optimize the wireless network, certain data parameters are gathered in order to optimize the network. The gathered parameters are then utilized to determine best case links for various attached wireless station devices in order to: 1) optimize the network and 2) optimize the per station (STA) links. The control points utilized to determine the network optimization will vary based on the desired outcomes for the system. As such, configurable 'profiles' will be utilized in order to prioritize outcomes for the system. These profiles may be utilized by the network steering controller in order to steer wireless station devices to optimize the network in the desired fashion.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:
   initiating a station steering assessment of a wireless network including at least a station, a connection point, and a gateway device;
   identifying an active steering profile, wherein the active steering profile is identified from one or more steering profiles, each steering profile comprising one or more parameters associated with specific trigger points for steering one or more stations, wherein the specific trigger points are associated with specific instances in which one or more stations are to be steered to one or more connection points, and wherein each of the one or more steering profiles comprise differing parameter thresholds that are associated with the specific trigger points;
   gathering one or more metrics of the wireless network; and
   steering one or more stations to one or more connection points based upon a comparison of the gathered one or more metrics and the one or more parameters of the active steering profile, wherein the one or more parameters of the active steering profile comprise absorption properties of one or more building materials.

2. The method of claim 1, wherein the one or metrics of the wireless network comprise capabilities of the station.

3. The method of claim 1, wherein the one or metrics of the wireless network comprise signal quality metrics associated with communications between the station and the connection point.

4. The method of claim 1, wherein the one or metrics of the wireless network comprise an identification of one or more services currently in use by the station.

5. The method of claim 1, wherein the one or metrics of the wireless network comprise channel utilization of a channel currently used by the connection point.

6. The method of claim 1, wherein the one or more parameters of the active steering profile comprise threshold values for one or more signal quality metrics.

7. A network controller comprising one or more modules that:
   initiate a station steering assessment of a wireless network including at least a station, a connection point, and a gateway device;
   identify an active steering profile, wherein the active steering profile is identified from one or more steering profiles, each steering profile comprising one or more parameters associated with specific trigger points for steering one or more stations, wherein the specific trigger points are associated with specific instances in which one or more stations are to be steered to one or more connection points, and wherein each of the one or more steering profiles comprise differing parameter thresholds that are associated with the specific trigger points;
   gather one or more metrics of the wireless network; and
   steer one or more stations to one or more connection points based upon a comparison of the gathered one or more metrics and the one or more parameters of the active steering profile, wherein the one or more parameters of the active steering profile comprise absorption properties of one or more building materials.

8. The network controller of claim 7, wherein the one or metrics of the wireless network comprise capabilities of the station.

9. The network controller of claim 7, wherein the one or metrics of the wireless network comprise signal quality metrics associated with communications between the station and the connection point.

10. The network controller of claim 7, wherein the one or metrics of the wireless network comprise channel utilization of a channel currently used by the connection point.

11. The network controller of claim 7, wherein the one or more parameters of the active steering profile comprise threshold values for one or more signal quality metrics.

12. One or more non-transitory computer readable media having instructions operable to cause one or more processors to perform the operations comprising:
- initiating a station steering assessment of a wireless network including at least a station, a connection point, and a gateway device;
- identifying an active steering profile, wherein the active steering profile is identified from one or more steering profiles, each steering profile comprising one or more parameters associated with specific trigger points for steering one or more stations, wherein the specific trigger points are associated with specific instances in which one or more stations are to be steered to one or more connection points, and wherein each of the one or more steering profiles comprise differing parameter thresholds that are associated with the specific trigger points;
- gathering one or more metrics of the wireless network; and
- steering one or more stations to one or more connection points based upon a comparison of the gathered one or more metrics and the one or more parameters of the active steering profile, wherein the one or more parameters of the active steering profile comprise absorption properties of one or more building materials.

13. The one or more non-transitory computer-readable media of claim 12, wherein the one or metrics of the wireless network comprise capabilities of the station.

14. The one or more non-transitory computer-readable media of claim 12, wherein the one or metrics of the wireless network comprise signal quality metrics associated with communications between the station and the connection point.

15. The one or more non-transitory computer-readable media of claim 12, wherein the one or metrics of the wireless network comprise an identification of one or more services currently in use by the station.

16. The one or more non-transitory computer-readable media of claim 12, wherein the one or metrics of the wireless network comprise channel utilization of a channel currently used by the connection point.

17. The one or more non-transitory computer-readable media of claim 12, wherein the one or more parameters of the active steering profile comprise threshold values for one or more signal quality metrics.

* * * * *